United States Patent Office 3,203,984
Patented Aug. 31, 1965

3,203,984
BIS(HALODIARYLPHOSPHINE)DECABORANES AND THEIR PREPARATION
Theodore L. Heying, North Haven, and Hansjuergen A. Schroeder, New Haven, Conn., assignors to Olin Mathieson Chemical Corporation, a corporation of Virginia
No Drawing. Filed June 28, 1962, Ser. No. 205,859
9 Claims. (Cl. 260—543)

This invention relates to novel phosphorus-containing derivatives of decaborane. More particularly, this invention relates to bis-(halodiarylphosphine) decaboranes and to a method for their preparation.

The novel phosphorus-containing derivatives of this invention have the general formula:

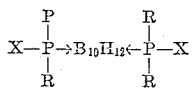

wherein X is a halogen and R is an aryl radical selected from the group consisting of phenyl, tolyl, xylyl, naphthyl, or biphenyl and alkyl-substituted derivatives of the same aryl radicals.

In accordance with this invention the novel compounds of this invention are prepared by reacting a diarylhalophosphine with decaborane. If desired, the reaction can be carried out in the presence of an inert organic solvent. Suitable inert organic solvents include the lower dialkyl ethers, such as diethyl ether, di-n-propyl ether, di-isopropyl ether, di-n-butyl ether, di-isoamyl ether, etc., aromatic hydrocarbon solvents such as, benzene, toluene, xylene, etc., and aliphatic hydrocarbon solvents such as petroleum ether, ligroin, etc.

The reaction proceeds as shown in the following equation:

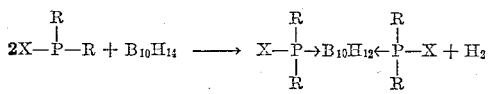

wherein X and R have the same meaning as previously described. Although the reaction proceeds satisfactorily at room temperature, temperatures as low as 0° C. and higher temperatures up to 150° C. can be employed, if desired. The preferred reaction temperatures are from about 20° C. to about 110° C. When a solvent is employed, the reaction can conveniently be completed by heating the reaction mixture at reflux temperature. Generally the reaction is carried out at atmospheric pressure although pressures varying from subatmospheric up to about 5 atmospheres can be utilized. The reaction time will vary widely from about 0.05 hour to about 40 hours or more and preferably will be from about 0.15 hour to about 25 hours depending upon the particular reaction conditions. Completion of the reaction is indicated by the cessation of the evolution of hydrogen. Stoichiometric quantities of the reactants are usually employed although, if desired, an excess of the diarylchlorophosphine in an amout of from 2 to 3 times the stoichiometric requirement can be utilized. Solvents employed in the process must be free of water since any water present will react with the dihalo-compound formed resulting in a reduction in yield. Recovery of the products from the reaction mixture is accomplished by filtration followed by recrystallization from an anhydrous solvent such as, ethyl acetate, benzene, benzene-heptane (3:1), carbon tetrachloride-chloroform (3:2) etc. or by evaporation of the reaction mixture to dryness followed by the same type of recrystallization procedure.

Although the compound bis(triphenylphosphine) decaborane has been reported in the literature by M. F. Hawthorne and A. R. Pitochelli, JACS, 80, 685 (1958), this compound melts above 300° C., and is unreactive. In contrast, the compounds of this invention possess two highly reactive halogen atoms. It has been found that nucleophilic substitution of the novel compounds of this invention in the proper reaction medium can be readily accomplished. Thus, in aqueous suspension conversion to the bis-hydroxy-derivative is achieved in high yield in the presence of a di(lower alkyl) amine. The preparation of the bis-hydroxy derivatives is set forth in Schroeder application Serial No. 205,861 for Product and Process, filed of even date herewith. It has also been discovered that the novel compounds of this invention can be readily converted into polymers which exhibit outstanding heat stability, as described in Reiner and Schroeder application for Composition and Process filed of even date herewith (now U.S. Patent 3,141,856, issued July 21, 1964). For example, a polymer can be prepared by the condensation of bis(hydroxydiphenylphosphine) decaborane with bis(chlorodiphenylphosphine) decaborane in approximately equal molar proportions in benzene at temperatures ranging from about 80° C. to about 220° C. in the presence of triethylamine. Polymers produced in this manner do not decompose on heating up to temperatures as high as 270° C. and can be formed into films which are useful as protective coatings for metal objects in high temperature service. A solution of the polymer in a suitable solvent, such as methylpyrrolidone can be applied to the object by dipping or brushing and the protective film formed by evaporation of the solvent.

The diarylchlorophosphine starting materials utilized in this invention can be prepared from commercially available aryldichlorophosphines by disproportionation with aluminum chloride according to the method of M. P. Brown and H. B. Silver, Chem. and Ind., 1961, 24. Suitabled iarylchlorophosphine starting materials include diphenylchlorophosphine, dinaphthylchlorophosphine, dibiphenylchlorophosphine, ditolylchlorophosphine, dixylylchlorophosphine and the corresponding bromine, iodine, and fluorine derivatives. In addition, alkyl substituted materials of the type mentioned can be employed in this invention as starting materials, for example, diisopropylphenyl-chlorophosphine, di-n-butylphenyl - chlorophosphine, di-methylbiphenyl - chlorophosphine, di-isoamyl-xylyl-chlorophosphine, and the corresponding bromine, iodine and fluorine derivatives.

Decaborane is a white crystalline solid having a melting point of 99.5° C. and a boiling point of 213° C. It can be prepared by the pyrolysis of diborane according to procedures well known in the art. The decaborane employed in this invention was purified by vacuum sublimation.

This invention is illustrated by the following examples to which it is, however, not limited.

Example I

A solution of diphenylchlorophosphine (88 g., 0.4 mole) in ether (100 ml.) was added to a solution of decaborane (22.4 g., 0.2 mole) in ether (200 ml.). Hydrogen was slowly evolved and, after stirring for 20 hours at 25° C., 98 g. of reaction product had precipitated. Recrystallization from anhydrous ethyl acetate gave 87 g. (77.0 percent of the theoretical yield) of pure bis(chlorodiphenylphosphine) decaborane, M.P. 212° C.

Calc'd for $C_{24}H_{32}B_{10}Cl_2P_2$: C, 51.33; H, 5.74; B, 19.27; Cl, 12.63; P, 11.03. Found: C, 51.95; H, 6.15; B, 19.20; Cl, 12.21; P, 11.00.

Example II

A solution of diphenylchlorophosphine (8.8 g., 0.04 mole) in ether (60 ml.) was added, with stirring, to a solution of decaborane (2.44 g., 0.02 mole) in ether (40 ml.). After stirring for 2 hrs. at 25° C., the reaction mixture was evaporated to dryness in vacuo. The residue (M.P. 92–96° C.) was recrystallized from ethyl acetate to give 7 g. (77.5 percent of the theoretical yield) of bis(chlorodiphenylphosphine) decaborane, M.P. 212° C.

Example III

A mixture of diphenylchlorophosphine (22 g., 0.1 mole), decaborane (6.1 g., 0.05 mole) and benzene (100 ml.) was refluxed for 15 minutes. After cooling, 200 ml. of petroleum ether (B.P. 38–42° C.) was added to the reaction mixture and the solid which had formed, was isolated by filtration. Recrystallization from anhydrous ethyl acetate gave 21 g. (75 percent of the theoretical yield) of pure bis(chlorodiphenylphosphine) decaborane.

Example IV

Decaborane (2.44 g., 0.02 mole) was dissolved in diphenylchlorophosphine (17.6 g., 0.08 mole) by agitating the reaction flask to which these materials had been added for 2 minutes. Hydrogen evolution commenced within a few minutes and as the reaction proceeded the reaction mixture turned pale yellow in color and at the same time the temperature increased slightly. After standing for 24 hours, the contents of the reaction flask was triturated with 25 ml. of anhydrous ethyl acetate. Filtration with suction gave 9.65 g. of crude bis(chlorodiphenylphosphine) decaborane, M.P. 204–207° C.

What is claimed is:

1. Bis(halodiarylphosphine) decaboranes of the general formula:

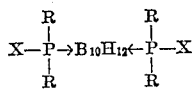

wherein X is a halogen and R is an aryl radical selected from the group consisting of phenyl, tolyl, xylyl, naphthyl, and biphenyl.

2. Bis(chlorodiphenylphosphine) decaborane.
3. A method for the preparation of bis(halodiarylphosphine) decaboranes of the formula:

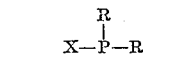

wherein X is a halogen and R is a radical selected from the group consisting of phenyl, tolyl, xylyl, naphthyl, and biphenyl, which comprises reacting decaborane at a temperature within the range of about 0° C. to about 150° C. with a compound of the formula:

$$X-\underset{R}{\overset{R}{P}}-R$$

wherein X is a halogen and R is a radical selected from the group consisting of phenyl, tolyl, xylyl, naphthyl, and biphenyl.

4. The method of claim 3 wherein the said compound is diphenylchlorophosphine.
5. The method of claim 3 wherein the reaction is carried out while the reactants are in admixture with an inert organic solvent.
6. The method of claim 3 wherein the inert solvent is diethyl ether.
7. The method for the preparation of bis(chlorodiphenylphosphine) decaborane which comprises reacting decaborane and diphenylchlorophosphine at a temperature of from about 0° C. to about 150° C.
8. The method of claim 7 wherein the reaction is carried out while the reactants are in admixture with an inert organic solvent.
9. The method of claim 8, wherein the inert organic solvent is diethyl ether.

References Cited by the Examiner

UNITED STATES PATENTS 3,118,932  1/64  Muetterties _____ 260—500
3,141,856  7/64  Reiner et al. _____ 260—543

OTHER REFERENCES

Zakharkin et al., "Izvest. Akad. Nauk. S.S.S.R. Otdel, Khim.," 1961, pp. 2078–2079.

Hawthorne et al., "J. Am. Chem. Soc.," vol. 82, pp. 1825–1829 (1960).

LORRAINE A. WEINBERGER, *Primary Examiner.*

LEON ZITVER, *Examiner.*